US012804507B2

(12) United States Patent
Du et al.

(10) Patent No.: US 12,804,507 B2
(45) Date of Patent: Nov. 17, 2026

(54) DEVICES, METHODS, APPARATUSES, AND COMPUTER READABLE MEDIA FOR CONDITIONAL HANDOVER

(71) Applicant: Nokia Technologies Oy, Espoo (FI)

(72) Inventors: Lei Du, Beijing (CN); Shashika Manosha Kapuruhamy Badalge, Oulu (FI); Lars Dalsgaard, Oulu (FI); Chunli Wu, Beijing (CN); Naizheng Zheng, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/225,598

(22) Filed: Jun. 2, 2025

(65) Prior Publication Data

US 2026/0019914 A1 Jan. 15, 2026

Related U.S. Application Data

(63) Continuation of application No. 19/062,872, filed as application No. PCT/CN2024/078625 on Feb. 26, 2024.

(51) Int. Cl.
*H04W 36/36* (2009.01)
*H04W 36/08* (2009.01)
(Continued)

(52) U.S. Cl.
CPC ......... *H04W 36/362* (2023.05); *H04W 36/08* (2013.01); *H04W 72/231* (2023.01); *H04W 76/19* (2018.02)

(58) Field of Classification Search
CPC . H04W 36/362; H04W 36/08; H04W 72/232; H04W 72/231; H04W 76/19
See application file for complete search history.

(56) References Cited

U.S. PATENT DOCUMENTS

2022/0014990 A1* 1/2022 Akl .................. H04W 36/0061
2022/0038976 A1* 2/2022 Hwang ............... H04W 36/362
(Continued)

FOREIGN PATENT DOCUMENTS

CN 115707052 A 2/2023
CN 117597989 A 2/2024
(Continued)

OTHER PUBLICATIONS

"New WID: Network energy savings for NR", 3GPP TSG RAN Meeting #98-e, RP-223540, Agenda: 9.1.1, Huawei, Dec. 12-16, 2022, pp. 1-6.
(Continued)

*Primary Examiner* — Mong-Thuy T Tran
(74) *Attorney, Agent, or Firm* — Carter, DeLuca & Farrell LLP

(57) ABSTRACT

Disclosed are devices, methods, apparatuses, and computer readable media for conditional handover. An example apparatus for a terminal device may include at least one processor and at least one memory. The at least one memory may store instructions that, when executed by the at least one processor, may cause the apparatus at least to: receive downlink
(Continued)

control information, DCI, indicating a network energy saving, NES, mode after detecting a condition of a NES conditional handover, CHO, is met; and check whether the condition is met when receiving the DCI.

15 Claims, 4 Drawing Sheets

(51) Int. Cl.
*H04W 72/231* (2023.01)
*H04W 76/19* (2018.01)

(56) References Cited

U.S. PATENT DOCUMENTS

| | | | | |
|---|---|---|---|---|
| 2022/0167221 | A1* | 5/2022 | Lee | H04W 36/00838 |
| 2022/0322174 | A1* | 10/2022 | Da Silva | H04W 76/19 |
| 2023/0055492 | A1* | 2/2023 | Kim | H04W 80/02 |
| 2023/0247504 | A1* | 8/2023 | Haustein | H04W 76/19 455/436 |
| 2024/0049069 | A1* | 2/2024 | Zhou | H04W 36/0069 |
| 2024/0098613 | A1* | 3/2024 | Zhou | H04W 36/0055 |
| 2024/0114406 | A1* | 4/2024 | Zhou | H04W 36/0055 |
| 2024/0147321 | A1* | 5/2024 | Zhou | H04W 36/24 |
| 2024/0147328 | A1* | 5/2024 | Kim | H04W 36/0055 |
| 2024/0187954 | A1* | 6/2024 | Zhou | H04W 36/0077 |
| 2024/0284277 | A1* | 8/2024 | Jeon | H04W 36/0072 |
| 2024/0292308 | A1* | 8/2024 | Hwang | H04W 76/27 |
| 2025/0261262 | A1 | 8/2025 | Basu Mallick et al. | |

FOREIGN PATENT DOCUMENTS

| | | | | |
|---|---|---|---|---|
| CN | 118338310 | A | 7/2024 | |
| CN | 120692615 | A * | 9/2025 | H04W 36/00835 |
| EP | 3923627 | A1 * | 12/2021 | H04W 36/08 |
| KR | 20250063470 | A | 5/2025 | |
| WO | 2024/030635 | A1 | 2/2024 | |
| WO | 2024168108 | A1 | 8/2024 | |
| WO | 2024170689 | A1 | 8/2024 | |
| WO | 2024196524 | A1 | 9/2024 | |
| WO | 2025001171 | A1 | 1/2025 | |
| WO | 2025097420 | A1 | 5/2025 | |

OTHER PUBLICATIONS

"3rd Generation Partnership Project; Technical Specification Group Radio Access Network; NR; Requirements for support of radio resource management (Release 18)", 3GPP TS 38.133, V18.4.0, Dec. 2023, 6361 pages.
"3rd Generation Partnership Project; Technical Specification Group Radio Access Network; NR; NR and NG-RAN Overall Description; Stage 2 (Release 18)", 3GPP TS 38.300, V18.0.0, Dec. 2023, pp. 1-265.
Patent Cooperation Treaty Application No. PCT/CN2023/130947, "Conditional Handover in Network Energy Saving", filed on Nov. 10, 2023, pp. 1-31.
"RRM requirements impact due to other NES features", 3GPP TSG-RAN WG4 Meeting #110, R4-2400818, Agenda: 8.26.2.1, Nokia, Feb. 26-Mar. 1, 2024, 3 pages.
"38.133 CR on handover delays for NES-based CHO", 3GPP TSG-RAN WG4 Meeting #110, R4-2400819, Nokia, Feb. 26-Mar. 1, 2024, 7 pages.
"Draft CR for conditional handover requirements on network energy saving", 3GPP TSG-RAN WG4 Meeting #109, R4-2321560, vivo, Nov. 13-17, 2023, 6 pages.
International Search Report and Written Opinion received for corresponding Patent Cooperation Treaty Application No. PCT/CN2024/078625, dated Nov. 6, 2024, 8 pages.
"Discussion on LS on NES CHO", 3GPP TSG RAN WG1 Meeting #115, R1-2311800, Agenda: 5, Nokia, Nov. 13-17, 2023, 5 pages.
"Discussion on CHO enhancements for NES", 3GPP TSG-RAN WG2 Meeting #124, R2-2313075, Agenda: 7.3.5, Huawei, Nov. 13-17, 2023, 3 pages.
Office action received for corresponding Taiwan Patent Application No. 114106511, dated Feb. 3, 2026, 10 pages of office action and no page of translation available.
"Connected Mode Mobility for NES", 3GPP TSG-RAN WG2 Meeting #124, R2-2313493, Agenda: 7.3.5, Nokia, Nov. 13-17, 2023, 22 pages.
"Cell Switch off and NES Mode Indication," 3GPP TSG-RAN WG2 Meeting #125, R2-2400508, Lenovo, Motorola Mobility, Continental Automotive, Nokia, Nokia Shanghai Bell, BT Plc, Vodafone, Sony, Google, CEWIT, Deutsche Telekom, Feb. 26-Mar. 1, 2024, 4 pages.
"Remaining issues on NES general," 3GPP TSG-RAN WG4 Meeting # 110, R4-2400973, Ericsson, Feb. 26-Mar. 1, 2024, 3 pages.
"(Netw_Energy_NR-Core)Draft CR for conditional handover requirements on network energy saving," 3GPP TSG-RAN WG4 Meeting #110, R4-2401504, vivo, Feb. 26-Mar. 1, 2024, 6 pages.
"General RRM issues for NES," 3GPP TSG-RAN WG4 Meeting # 109, R4-2319152, Ericsson, Nov. 13-17, 2023, 5 pages.
"CR on maintenance for NES CHO," 3GPP TSG-RAN WG4 Meeting # 110, R4-2401329, Huawei, HiSilicon, Feb. 26-Mar. 1, 2024, 6 pages.
"Discussion on the remaining issues of NES based CHO," 3GPP TSG-RAN WG2 Meeting #124, R2-2312581, vivo, Nov. 13-17, 2023, 4 pages.
"CHO procedure enhancements," 3GPP TSG-RAN WG2 Meeting #124, R2-2313254, CATT, Turkcell, Nov. 13-17, 2023, 6 pages.
"(Netw_Energy_NR-Core)CR to NES-based conditional handover requirement," 3GPP TSG-RAN WG4 Meeting #110, R4-2401057, Apple, Feb. 26-Mar. 1, 2024, 5 pages.
"Draft CR for conditional handover requirements on network energy saving," 3GPP TSG-RAN WG4 Meeting #109, R4-2319067, vivo, Nov. 13-17, 2023, 5 pages.

* cited by examiner

DEVICES, METHODS, APPARATUSES, AND COMPUTER READABLE MEDIA FOR CONDITIONAL HANDOVER

TECHNICAL FIELD

Various example embodiments relate to devices, methods, apparatuses, and computer readable media for conditional handover (CHO).

BACKGROUND

Network energy saving (NES) is introduced for energy saving on a cell, which may enter into a NES mode for saving energy, for example, activating Cell DTX or Cell DRX or being turned off. NES CHO, also referred to as NES-based handover or NES-based CHO is introduced for enabling a user equipment (UE) to faster move out of a source cell which is to enter into the NES mode.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, disclosed is an apparatus for a terminal device. The apparatus may include at least one processor and at least one memory. The at least one memory may store instructions that, when executed by the at least one processor, may cause the apparatus at least to: receive downlink control information, DCI, indicating a network energy saving, NES, mode after detecting a condition of a NES conditional handover, CHO, is met; and check whether the condition is met when receiving the DCI.

In a second aspect, disclosed is a method performed by an apparatus for a terminal device. The method may comprise: receiving downlink control information, DCI, indicating a network energy saving, NES, mode after detecting a condition of a NES conditional handover, CHO, is met; and checking whether the condition is met when receiving the DCI.

In a third aspect, disclosed is an apparatus for a terminal device. The apparatus for the terminal device may comprise: means for receiving downlink control information, DCI, indicating a network energy saving, NES, mode after detecting a condition of a NES conditional handover, CHO, is met; and means for checking whether the condition is met when receiving the DCI.

In a fourth aspect, a computer readable medium is disclosed. The computer readable medium may comprise program instructions that, when executed by an apparatus for a terminal device, may cause the apparatus at least to: receive downlink control information, DCI, indicating a network energy saving, NES, mode after detecting a condition of a NES conditional handover, CHO, is met; and check whether the condition is met when receiving the DCI.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

Network may configure for a UE, a measurement event with a condition of a NES CHO, and a source cell may transmit to UEs camped on the source cell, a layer 1 (L1) signaling, for example, downlink control information (DCI), e.g. DCI with format 2-9, to indicate that the source cell is about to enter into a NES mode. If both the UE detects that the condition of the NES CHO is met, and the UE receives the DCI, e.g. DCI with format 2-9, the UE may execute a NES CHO.

In a scenario where the UE detects that the condition of the NES CHO is met and then receives the DCI with format 2-9, because the condition may vary from time to time, it is possible that the condition is not met when the UE receives the DCI with format 2-9. And in this case, because the network is not aware of the real-time condition of the UE, the network is not aware whether or when the configured condition is met.

Example embodiments of the present disclosure provide solutions for CHO. According to the example embodiments of the present disclosure, the UE may behave properly in the above scenario, and handover delay for NES CHO may be well defined so that network has understanding on the UE behavior.

Figure 1:
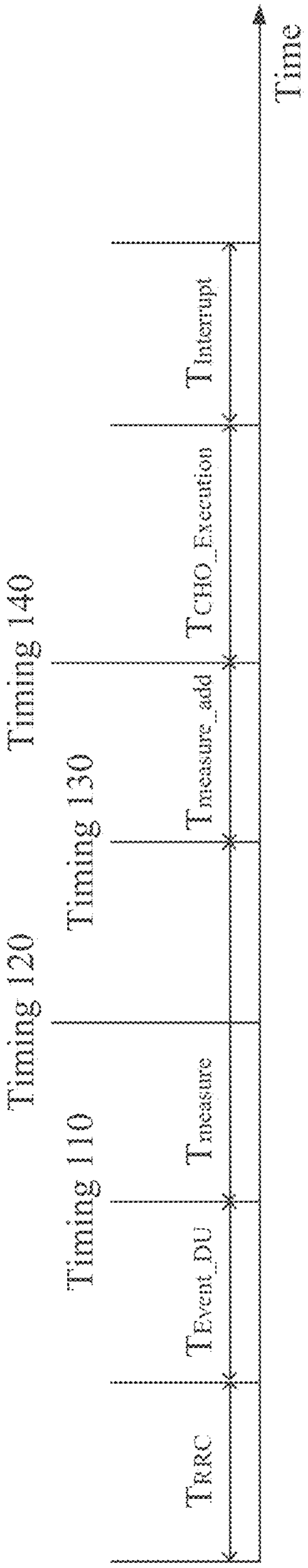
FIG. 1 shows an exemplary scenario of handover delay for NES CHO to which the example embodiments of the present disclosure may be implemented.

FIG. 1 shows an exemplary scenario of handover delay for NES CHO to which the example embodiments of the present disclosure may be implemented. When the UE receives a radio resource control (RRC) message implying CHO the UE shall be ready to start the transmission of the new uplink physical random access channel (PRACH) channel within $D_{CHO}$ seconds from the end of the last transmission time interval (TTI) containing the RRC command. Referring to the FIG. 1, $D_{CHO}$ may denote the handover delay for NES CHO and may be defined by the following formula (1):

$$D_{CHO}=T_{RRC}+T_{Event\_DU}+T_{measure}+T_{interrupt}+T_{CHO\_execution} \quad (1)$$

where $T_{RRC}$ is the RRC procedure delay, $T_{Event\_DU}$ is the delay uncertainty which is the time from when the UE successfully decodes a conditional handover command e.g. the RRC message implying NES CHO until a condition exists at the measurement reference point which will trigger the conditional handover e.g. NES CHO, $T_{measure}$ is the measurements time, $T_{CHO\_execution}$ is the conditional execution preparation time, and $T_{interrupt}$ is the interruption time.

$T_{RRC}$, $T_{Event\_DU}$, $T_{measure}$, $T_{CHO\_execution}$, and $T_{interrupt}$ are defined according to 3rd Generation Partnership Project Technical Specification (3GPP TS) 38.133 where the condition is the condition specific to the NES CHO, and $T_{measure}$ add will be described later.

Referring to the FIG. 1, a timing 110 is start timing of the measurements time. In the exemplary scenario shown in the FIG. 1, at a timing 120, the UE detects that the condition of the NES CHO is met, and then at a timing 130, the UE receives, e.g. from the source cell, the DCI indicating that the source cell is to enter into the NES mode, e.g. the DCI with format 2-9, which means in this exemplary scenario, the DCI command comes after the NES CHO condition is met.

Figure 2A:
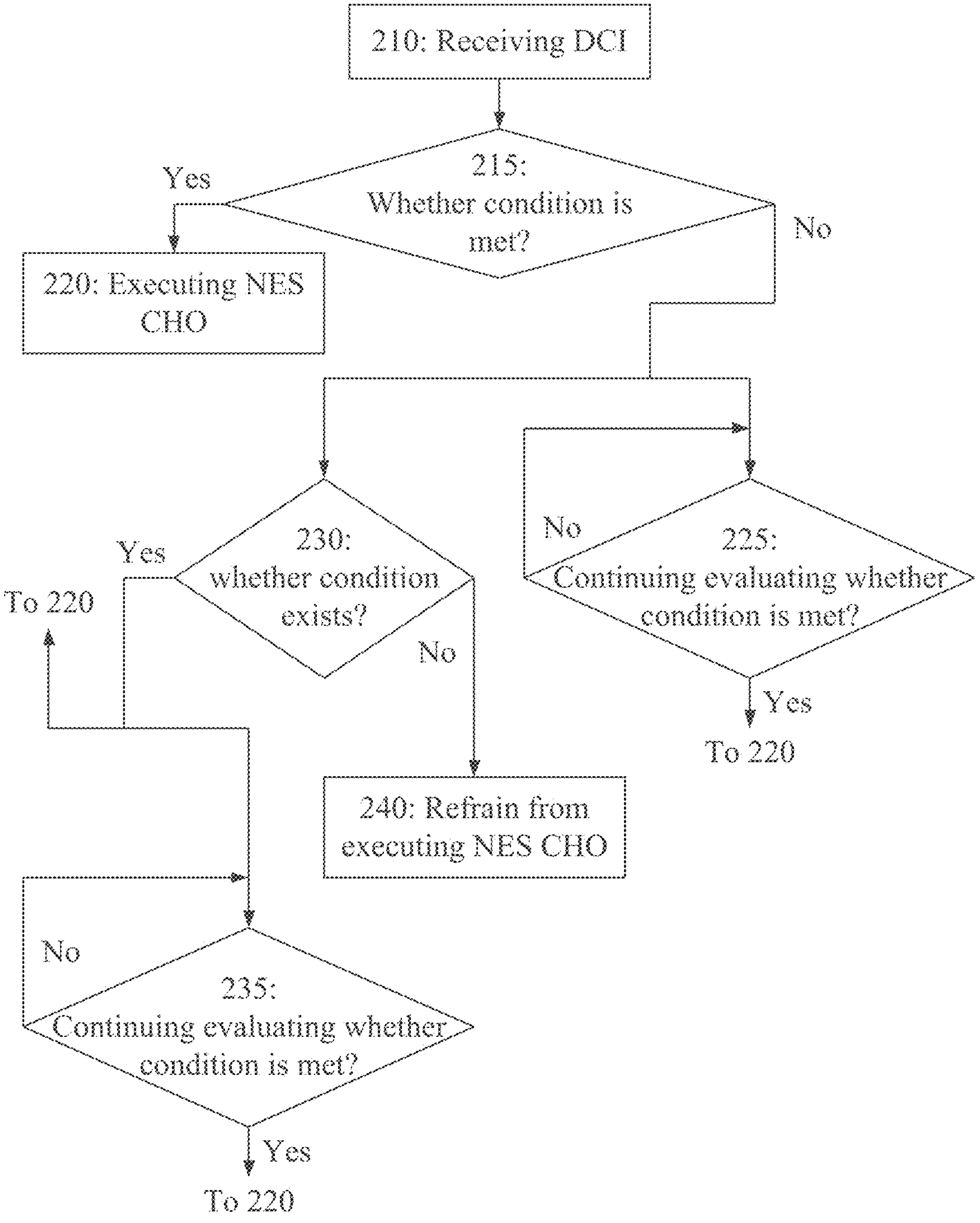
FIG. 2A shows an exemplary flowchart of NES CHO according to the example embodiments of the present disclosure.

FIG. 2A shows an exemplary flowchart of NES CHO according to the example embodiments of the present disclosure. The operations in the FIG. 2A may be performed by any UE configured with a measurement event with a condition of the NES CHO. The measurement event may be any of the measurement events that have been defined in TS 38.133, for example, reference signal receiving power (RSRP) of a neighbor cell, and the condition may be, for example, the RSRP of the neighbor cell RSRP becomes better than a threshold.

In an operation 210, after at the timing 120 detecting the condition of the NES CHO is met, at the timing 130, the UE receives the DCI indicating the NES mode. In an operation 215, the UE may check whether the condition is met when receiving the DCI. In some embodiments, the UE may check whether the condition is met at the time of receiving the DCI. Alternatively or additionally, in some embodiments, the UE may check whether the condition is met in response to the receiving of the DCI.

If the condition is met when receiving the DCI ("Yes" prong of the operation 215), in an operation 220, the UE may execute the NES CHO. In some embodiments, in the operation 220, the UE may execute the NES CHO immediately after checking the condition is met. In some embodiments, in the operation 220, the UE may execute the NES CHO without further evaluating the condition if the condition is met when receiving the DCI.

In some embodiments, if the condition is unmet when receiving the DCI ("No" prong of the operation 215), in an operation 225, the UE may continue evaluating whether the condition is met after receiving the DCI. When evaluating the condition is met ("Yes" prong of the operation 225), the UE may perform the operation 220 to execute the NES CHO. The time for continuing evaluating whether condition is met is no longer than a certain time period e.g. e.g. the SSB based measurement period $T_{SSB\_measurement\_period\_intra}$ in case the UE performs an intra-frequency handover and or $T_{SSB\_measurement\_period}$ inter in case the UE performs an inter-frequency handover as specified in TS 38.133.

Alternatively, when evaluating the condition is unmet ("No" prong of the operation 225), the UE may continue to perform the operation 225 to evaluate whether the condition is met. In some embodiments, if the number of the NES CHO condition evaluations the UE performs reaches a maximum number, the UE may exit the procedure of the CHO or do not execute CHO and instead perform some other actions e.g. UE reestablishment, cell selection/reselection/redirection etc.

Alternatively or additionally, in some embodiments, if the condition is unmet when receiving the DCI ("No" prong of the operation 215), in an operation 230, the UE may check whether the condition exists when receiving the DCI. The existence of the condition may be, for example, the case that the condition, e.g. neighbor cell RSRP becomes better than a threshold, starts to appear, and the satisfaction of the condition (i.e. condition is met) may be the case that the condition has been realized for some time, for example, the UE has measured the neighbor cell for some time in order to make sure the condition is met.

In some embodiments, if the condition exists when receiving the DCI ("Yes" prong of the operation 230), the UE may deem the condition is met and perform the operation 220 to execute the NES CHO. In some embodiments, in the operation 220, the UE may execute the NES CHO immediately after checking the condition exists or in response to checking the condition exists. In some embodiments, in the operation 220, the UE may execute the NES CHO without further evaluating the condition if the condition exists when receiving the DCI.

Alternatively or additionally, in some embodiments, if the condition exists when receiving the DCI ("Yes" prong of the operation 230), in an operation 235, the UE may continue evaluating whether the condition is met after receiving the DCI. When evaluating the condition is met ("Yes" prong of the operation 235), the UE may perform the operation 220 to execute the NES CHO. The time for continuing evaluating whether condition is met is no longer than a certain time period e.g. e.g. the SSB based measurement period $T_{SSB\_measurement\_period\_intra}$ Or $T_{SSB\_measurement\_period\_inter}$ as specified in TS 38.133.

Alternatively, when evaluating the condition is unmet ("No" prong of the operation 235), the UE may continue to perform the operation 235 to evaluate whether the condition is met. In some embodiments, if the number of the NES CHO condition evaluations the UE performs reaches a maximum number, the UE may exit the procedure of the CHO or do not execute CHO.

In some embodiments, if the condition does not exist when receiving the DCI ("No" prong of the operation 230), in an operation 240, the UE may refrain from executing the NES CHO. In this case, the UE may exit the procedure of the CHO.

In some embodiments, the UE may perform at least one of the following if refraining from executing the NES CHO: RRC reestablishment, cell selection, cell reselection, or cell redirection.

Figure 2B:
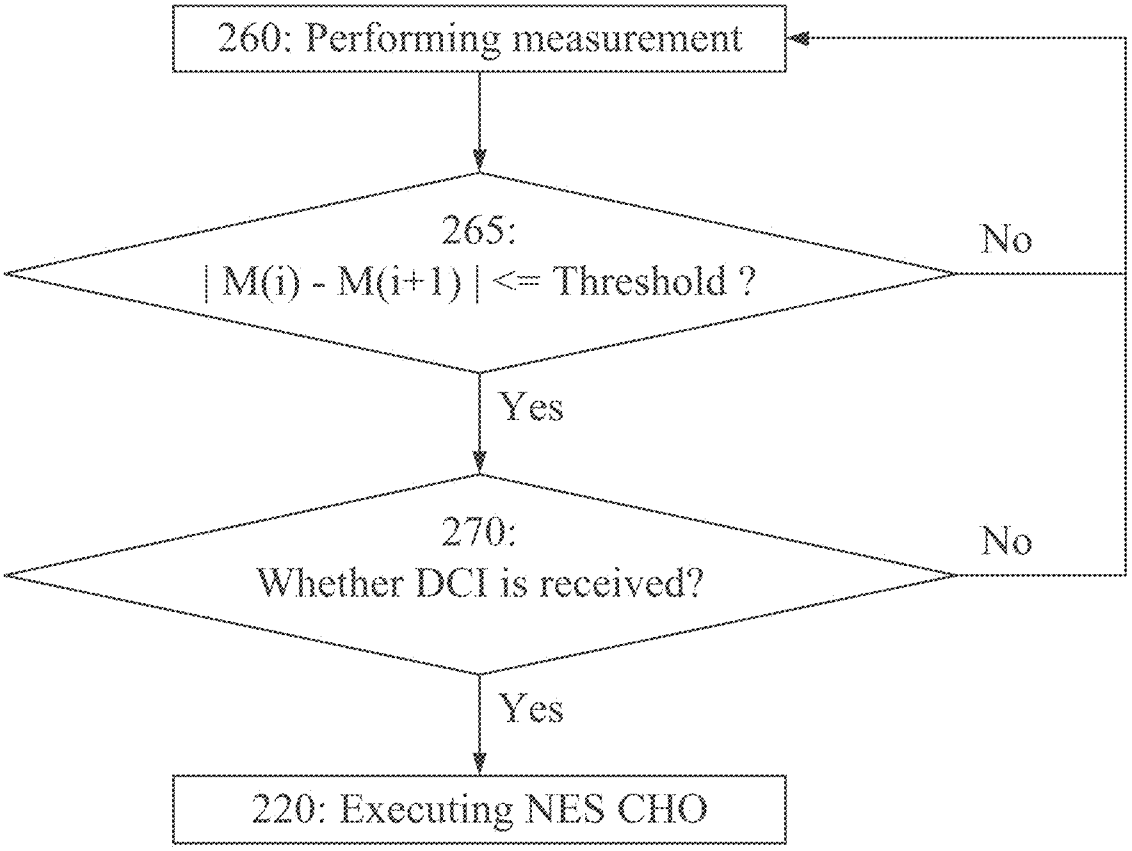
FIG. 2B shows an exemplary example for checking whether a condition is met according to the example embodiments of the present disclosure.

FIG. 2B shows an exemplary example for checking whether a condition is met according to the example embodiments of the present disclosure. The operations in the FIG. 2B may be performed by the UE above mentioned.

In an operation 260, the UE may perform measurement on the configured event. In an operation 265, the UE may compare whether a difference between two consecutive measurements related to the condition is below a threshold. For example, the UE may determine whether the following formula (2) is met.

$$|M(i)-M(i+1)| <= \text{Threshold} \qquad (2)$$

where M(i) is the measurement at $i^{th}$ instance.

If the UE keeps on evaluating the NES CHO condition and identifies that the difference between two consecutive measurements related to the condition is not significant ("Yes" prong of the operation 265), when receiving the DCI ("Yes" prong of the operation 270), the UE may perform the operation 220 to execute the NES CHO.

When evaluating the condition is unmet ("No" prong of the operation 265), or when the UE has not received the DCI ("No" prong of the operation 270), the UE may continue to perform the operation 260 to perform the measurement.

According to example embodiments of the present disclosure, the UE completes the NES CHO within a handover delay, for example, the $D_{CHO}$ described with respect to the FIG. 1. The handover delay includes a measurement time delay.

Referring back to the FIG. 1, in some embodiments, the measurement time delay may be from a timing the condition starts to exist to a timing of successfully decoding the DCI, if executing the NES CHO when receiving the DCI. For example, in case of executing the NES CHO when receiving the DCI, the measurement time delay may be from the timing 110 to the timing 130, which is the $T_{measure}$, and the formula (1) applies.

In some embodiments, the measurement time delay may be from a timing the condition starts to exist to a timing of successfully decoding the DCI, plus an additional time from the timing of successfully decoding the DCI to a timing of evaluating the condition is met, if continuing evaluating whether the condition is met after receiving the DCI. The UE evaluates the condition is met at a timing 140, and $T_{measure}$ add represents the additional time. For example, in case of continuing evaluating whether the condition is met after receiving the DCI, the measurement time delay may be the legacy $T_{measure}$ plus the additional time $T_{measure}$ add, and the formula (1) may be replaced with the following formula (3):

$$D_{CHO} = T_{RRC} + T_{Event\_DU} + T_{measure} + T_{measure\_add} + T_{interrupt} + T_{CHO\_execution} \qquad (3)$$

In some embodiments, the additional time is less than a measurement period of synchronous signal blocks (SSBs) based measurement. The measurement period of SSB-based measurement may be, for example, $T_{SSB\_measurement\_period\_intra}$ or $T_{SSB\_measurement\_period\_inter}$ as defined in 3GPP TS 38.133. In the example embodiments of the present disclosure, the SSB may also refer to synchronous signal and physical broadcast channel (PBCH) block.

In some embodiments, the measurement time delay is larger than a time to identify a detectable target cell. The time to identify a detectable target cell may be, for example, $T_{identify\_intra\_with\_index}$ or $T_{identify\_intra\_without\_index}$ as defined in 3GPP TS 38.133, in case the UE performs an intra-frequency handover. The time to identify a detectable target cell may be, for example, $T_{identify\_inter\_with\_index}$ or $T_{identify\_inter\_without\_index}$ as defined in 3GPP TS 38.133, in case the UE performs an inter-frequency handover.

According to the example embodiments of the present disclosure, an example representing the possible impact of the measurement time delay on the specification may be shown as Table 1 below.

TABLE 1

Option 1:
For NES-based conditional intra-frequency handover:
- If UE successfully decodes DCI 2-9 command earlier than $T_{measure\_first}$ or $T_{Event\_DU}$ + $T_{identify\_intra\_with\_index}$, then the measurement time delay equal to $T_{identify\_intra\_with\_index}$ or $T_{identify\_intra\_without\_index}$
- If UE successfully decodes DCI 2-9 command later than $T_{measure\_first}$ or $T_{Event\_DU}$ + $T_{identify\_intra\_with\_index}$, and the condition of NES CHO is met when receiving DCI 2-9 command, then the measurement time delay equals to the time from the end of $T_{event\_DU}$ until UE successfully decodes DCI 2-9 command.
- If UE successfully decodes DCI 2-9 command occurs later than $T_{measure\_first}$ or $T_{Event\_DU}$ + $T_{identify\_intra\_with\_index}$, and the condition of NES CHO is not met when receiving DCI 2-9 command, then the measurement time delay equals to the time from the end of $T_{event\_DU}$ until UE successfully decodes DCI 2-9 command, plus the time to additional measure and evaluate the NES CHO event $T_{measure\_add}$.
  Where $T_{measure\_add}$ is less than $T_{SSB\_measurement\_period\_intra}$.

Option 2:
For NES-based conditional intra-frequency handover:
- If UE successfully decodes DCI 2-9 command earlier than $T_{measure\_first}$ or $T_{Event\_DU}$ + $T_{identify\_intra\_with\_index}$, then the measurement time delay equal to $T_{identify\_intra\_with\_index}$ or $T_{identify\_intra\_without\_index}$
- If UE successfully decodes DCI 2-9 command later than $T_{measure\_first}$ or $T_{Event\_DU}$ + $T_{identify\_intra\_with\_index}$, and the condition of NES CHO is met when receiving DCI 2-9 command, then the measurement time delay equals to the time from the end of $T_{event\_DU}$ until UE successfully decodes DCI 2-9 command.
- If UE successfully decodes DCI 2-9 command later than $T_{measure\_first}$ or $T_{Event\_DU}$ + $T_{identify\_intra\_with\_index}$, and the condition of NES CHO is met but the condition exists when receiving DCI 2-9 command, then the measurement time delay equals to the time from the end of $T_{event\_DU}$ until UE successfully decodes DCI 2-9 command, plus the time to additional measure and evaluate the NES CHO event $T_{measure\_add}$.
- If UE successfully decodes DCI 2-9 command later than $T_{measure\_first}$ or $T_{Event\_DU}$ + $T_{identify\_intra\_with\_index}$, and the condition of NES CHO is met but the condition exists when receiving DCI 2-9 command, then the measurement time delay equals to the time from the end of $T_{event\_DU}$ until UE successfully decodes DCI 2-9 command, plus the time to additional measure and evaluate the NES CHO event $T_{measure\_add}$.

$T_{measure\_first}$ may represent the timing of detecting the condition of the NES CHO is met, for example, the first timing of detecting the condition of the NES CHO is met after receiving RRC command i.e. the timing 120. Table 1 takes intra-frequency handover as example, those skilled in the art may understand the same principle applies to inter-frequency handover.

Figure 3:
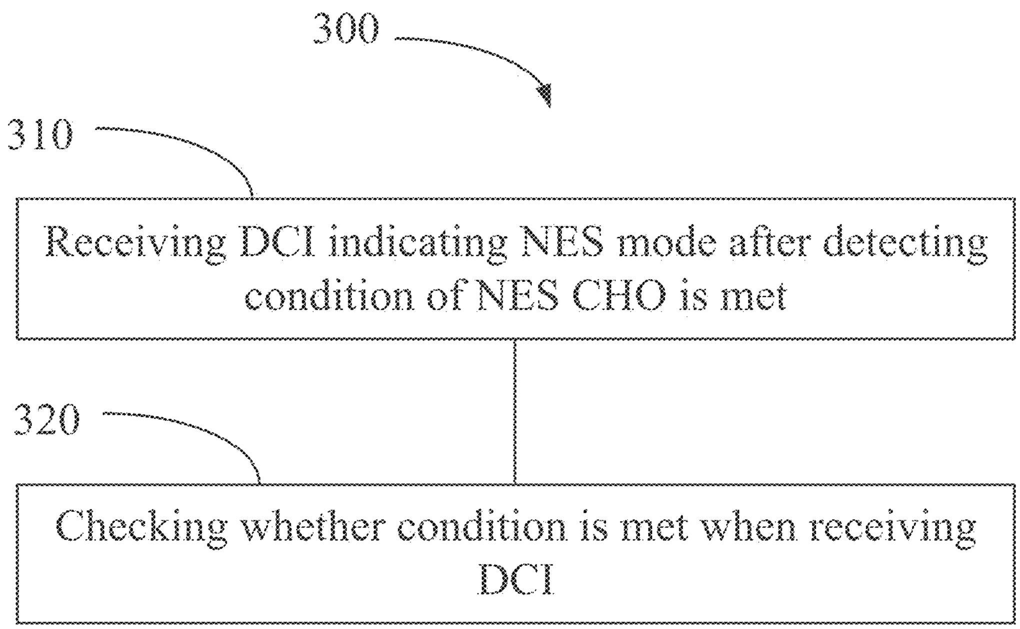
FIG. 3 shows a flow chart illustrating an example method 300 for CHO according to the example embodiments of the present disclosure.

FIG. 3 shows a flow chart illustrating an example method 300 for CHO according to the example embodiments of the present disclosure. The example method 300 may be performed for example by an apparatus for a terminal device such as the UE above mentioned.

Referring to the FIG. 3, the example method 300 may comprise: an operation 310 of receiving DCI indicating a NES mode after detecting a condition of a NES CHO is met; and an operation 320 of checking whether the condition is met when receiving the DCI.

In some embodiments, the example method 300 may comprise: executing the NES CHO if the condition is met when receiving the DCI.

In some embodiments, the example method 300 may comprise: executing the NES CHO without further evaluating the condition if the condition is met when receiving the DCI.

In some embodiments, the example method 300 may comprise: continuing evaluating whether the condition is met after receiving the DCI if the condition is unmet when receiving the DCI; and executing the NES CHO when evaluating the condition is met.

In some embodiments, the example method 300 may comprise: checking whether the condition exists when receiving the DCI if the condition is unmet when receiving the DCI.

In some embodiments, the example method 300 may comprise: executing the NES CHO if the condition exists when receiving the DCI.

In some embodiments, the example method 300 may comprise: executing the NES CHO without further evaluating the condition if the condition exists when receiving the DCI.

In some embodiments, the example method 300 may comprise: continuing evaluating whether the condition is met after receiving the DCI if the condition exists when receiving the DCI; and executing the NES CHO when evaluating the condition is met.

In some embodiments, the example method 300 may comprise: refraining from executing the NES CHO if the condition does not exist when receiving the DCI.

In some embodiments, the example method 300 may comprise: performing at least one of the following if refraining from executing the NES CHO: RRC reestablishment, cell selection, cell reselection, or cell redirection.

In some embodiments, the example method 300 may comprise: completing the NES CHO within a handover delay comprising a measurement time delay.

In some embodiments, the measurement time delay is from a timing the condition starts to exist to a timing of successfully decoding the DCI, if executing the NES CHO when receiving the DCI.

In some embodiments, the measurement time delay is from a timing the condition starts to exist to a timing of successfully decoding the DCI, plus an additional time from the timing of successfully decoding the DCI to a timing of evaluating the condition is met, if continuing evaluating whether the condition is met after receiving the DCI.

In some embodiments, the additional time is less than a measurement period of synchronous signal blocks based measurement.

In some embodiments, the measurement time delay is larger than a time to identify a detectable target cell.

In some embodiments, the condition is met if a difference between two consecutive measurements related to the condition is below a threshold.

Figure 4:
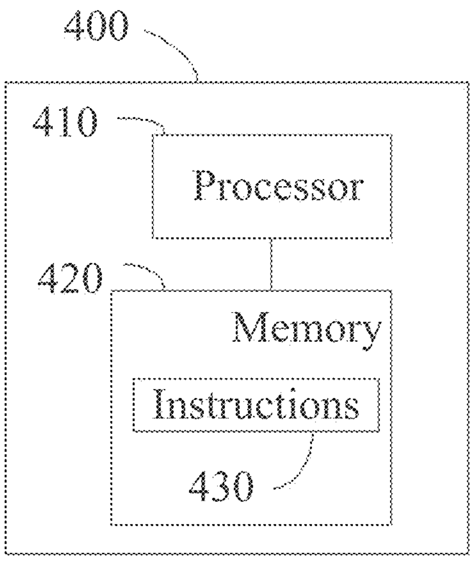
FIG. 4 shows a block diagram illustrating an example device 400 for CHO according to the example embodiments of the present disclosure.

FIG. 4 shows a block diagram illustrating an example device 400 for CHO according to the example embodiments of the present disclosure. The device, for example, may be at least part of an apparatus for a terminal device such as the UE in the above examples.

As shown in the FIG. 4, the example device 400 may include at least one processor 410 and at least one memory 420 that may store instructions 430. The instructions 430, when executed by the at least one processor 410, may cause the device 400 at least to perform the example method 200 described above.

In various example embodiments, the at least one processor 410 in the example device 400 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 410 may also include at least one other circuitry or element not shown in the FIG. 4.

In various example embodiments, the at least one memory 420 in the example device 400 may include at least one storage medium in various forms, such as a transitory memory and/or a non-transitory memory. The transitory memory may include, but not limited to, for example, a random-access memory (RAM), a cache, and so on. The non-transitory memory may include, but not limited to, for example, a read only memory (ROM), a hard disk, a flash memory, and so on. The term "non-transitory," as used herein, is a limitation of the medium itself (i.e., tangible, not a signal) as opposed to a limitation on data storage persistency (e.g., RAM vs. ROM). Further, the at least memory 420 may include, but are not limited to, an electric, a magnetic, an optical, an electromagnetic, an infrared, or a semiconductor system, apparatus, or device or any combination of the above.

Further, in various example embodiments, the example device 400 may also include at least one other circuitry, element, and interface, for example at least one I/O interface, at least one antenna element, and the like.

In various example embodiments, the circuitries, parts, elements, and interfaces in the example device 400, including the at least one processor 410 and the at least one memory 420, may be coupled together via any suitable connections including, but not limited to, buses, crossbars, wiring and/or wireless lines, in any suitable ways, for example electrically, magnetically, optically, electromagnetically, and the like.

It is understood that the structure of the device on the side of the UE is not limited to the above example device 400.

Figure 5:
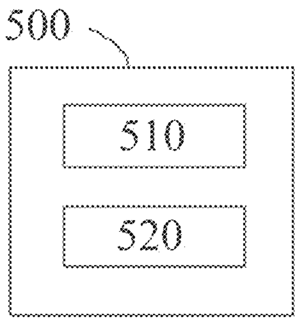
FIG. 5 shows a block diagram illustrating an example apparatus 500 for CHO according to the example embodiments of the present disclosure.

FIG. 5 shows a block diagram illustrating an example apparatus 500 for CHO according to the example embodiments of the present disclosure. The apparatus, for example, may be at least part of a terminal device such as the UE in the above examples.

As shown in the FIG. 5, the example apparatus 500 may comprise: means 510 for receiving DCI indicating a NES mode after detecting a condition of a NES CHO is met; and means 520 for checking whether the condition is met when receiving the DCI.

In some embodiments, the apparatus 500 may comprise means for executing the NES CHO if the condition is met when receiving the DCI.

In some embodiments, the apparatus 500 may comprise means for executing the NES CHO without further evaluating the condition if the condition is met when receiving the DCI.

In some embodiments, the apparatus 500 may comprise means for continuing evaluating whether the condition is met after receiving the DCI if the condition is unmet when receiving the DCI; and means for executing the NES CHO when evaluating the condition is met.

In some embodiments, the apparatus 500 may comprise means for checking whether the condition exists when receiving the DCI if the condition is unmet when receiving the DCI.

In some embodiments, the apparatus 500 may comprise means for executing the NES CHO if the condition exists when receiving the DCI.

In some embodiments, the apparatus 500 may comprise means for executing the NES CHO without further evaluating the condition if the condition exists when receiving the DCI.

In some embodiments, the apparatus 500 may comprise means for continuing evaluating whether the condition is met after receiving the DCI if the condition exists when receiving the DCI; and means for executing the NES CHO when evaluating the condition is met.

In some embodiments, the apparatus 500 may comprise means for refraining from executing the NES CHO if the condition does not exist when receiving the DCI.

In some embodiments, the apparatus 500 may comprise means for performing at least one of the following if refraining from executing the NES CHO: RRC reestablishment, cell selection, cell reselection, or cell redirection.

In some embodiments, the apparatus 500 may comprise means for completing the NES CHO within a handover delay comprising a measurement time delay.

In some embodiments, the measurement time delay is from a timing the condition starts to exist to a timing of successfully decoding the DCI, if executing the NES CHO when receiving the DCI.

In some embodiments, the measurement time delay is from a timing the condition starts to exist to a timing of successfully decoding the DCI, plus an additional time from the timing of successfully decoding the DCI to a timing of evaluating the condition is met, if continuing evaluating whether the condition is met after receiving the DCI.

In some embodiments, the additional time is less than a measurement period of synchronous signal blocks based measurement.

In some embodiments, the measurement time delay is larger than a time to identify a detectable target cell.

In some embodiments, the condition is met if a difference between two consecutive measurements related to the condition is below a threshold.

In some example embodiments, examples of means in the example apparatus 500 may include circuitries. For example, an example of means 510 may include a circuitry configured to perform the operation 310 of the example method 300, and an example of means 520 may include a circuitry configured to perform the operation 320 of the example method 300.

The example apparatus 500 may further include means comprising circuitry configured to perform the example method 300. In some example embodiments, examples of means may also include software modules and any other suitable function entities.

The example embodiments of the present disclosure also provide a computer readable medium comprising program instructions that, when executed by an apparatus for a terminal device such as the UE in the above examples, may cause the apparatus at least to: receive DCI indicating a NES mode after detecting a condition of a NES CHO is met; and check whether the condition is met when receiving the DCI.

In some embodiments, the computer readable medium may include instructions that, when executed by the apparatus, may cause the apparatus to: execute the NES CHO if the condition is met when receiving the DCI.

In some embodiments, the computer readable medium may include instructions that, when executed by the apparatus, may cause the apparatus to: execute the NES CHO without further evaluating the condition if the condition is met when receiving the DCI.

In some embodiments, the computer readable medium may include instructions that, when executed by the apparatus, may cause the apparatus to: continue evaluating whether the condition is met after receiving the DCI if the condition is unmet when receiving the DCI; and execute the NES CHO when evaluating the condition is met.

In some embodiments, the computer readable medium may include instructions that, when executed by the apparatus, may cause the apparatus to: check whether the condition exists when receiving the DCI if the condition is unmet when receiving the DCI.

In some embodiments, the computer readable medium may include instructions that, when executed by the apparatus, may cause the apparatus to: execute the NES CHO if the condition exists when receiving the DCI.

In some embodiments, the computer readable medium may include instructions that, when executed by the apparatus, may cause the apparatus to: execute the NES CHO without further evaluating the condition if the condition exists when receiving the DCI.

In some embodiments, the computer readable medium may include instructions that, when executed by the apparatus, may cause the apparatus to: continue evaluating whether the condition is met after receiving the DCI if the condition exists when receiving the DCI; and execute the NES CHO when evaluating the condition is met.

In some embodiments, the computer readable medium may include instructions that, when executed by the apparatus, may cause the apparatus to: refrain from executing the NES CHO if the condition does not exist when receiving the DCI.

In some embodiments, the computer readable medium may include instructions that, when executed by the apparatus, may cause the apparatus to: perform at least one of the following if refraining from executing the NES CHO: RRC reestablishment, cell selection, cell reselection, or cell redirection.

In some embodiments, the computer readable medium may include instructions that, when executed by the apparatus, may cause the apparatus to: complete the NES CHO within a handover delay comprising a measurement time delay.

In some embodiments, the measurement time delay is from a timing the condition starts to exist to a timing of successfully decoding the DCI, if executing the NES CHO when receiving the DCI.

In some embodiments, the measurement time delay is from a timing the condition starts to exist to a timing of successfully decoding the DCI, plus an additional time from the timing of successfully decoding the DCI to a timing of evaluating the condition is met, if continuing evaluating whether the condition is met after receiving the DCI.

In some embodiments, the additional time is less than a measurement period of synchronous signal blocks based measurement.

In some embodiments, the measurement time delay is larger than a time to identify a detectable target cell.

In some embodiments, the condition is met if a difference between two consecutive measurements related to the condition is below a threshold.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the above description, the terms "terminal device", "communication device", "terminal", "user equipment" and "UE" may be used interchangeably.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and actions of the some embodiments described above can be combined to provide further embodiments. The accompanying claims and their equivalents are intended to cover such forms or modifications as would fall within the scope and spirit of the disclosure.

Abbreviations used in the description and/or in the figures are defined as follows:

3GPP TS 3rd Generation Partnership Project Technical Specification
CHO conditional handover
DCI downlink control information
DRX discontinous reception
DTX discontinous transmission
L1 layer 1
NES network energy saving
PBCH physical broadcast channel
PRACH physical random access channel
RRC radio resource control
RSRP reference signal receiving power
SSB synchronous signal blocks synchronous signal and PBCH block
TT transmission time interval
UE user equipment

What is claimed is:

1. An apparatus for a terminal device, comprising:
at least one processor; and
at least one memory storing instructions that, when executed by the at least one processor, cause the apparatus at least to:
receive downlink control information (DCI) indicating a network energy saving (NES) mode after detecting a condition of a NES conditional handover (CHO) is met;
check whether the condition is met when receiving the DCI; and
complete the NES CHO within a handover delay comprising a measurement time delay,
wherein the measurement time delay is from a timing the condition starts to exist to a timing of successfully decoding the DCI, if executing the NES CHO when receiving the DCI.

2. The apparatus of claim 1, wherein the apparatus is configured to:
execute the NES CHO if the condition is met when receiving the DCI.

3. The apparatus of claim 2, wherein the apparatus is configured to:
execute the NES CHO without further evaluating the condition if the condition is met when receiving the DCI.

4. The apparatus of claim 1, wherein the apparatus is configured to:
continue evaluating whether the condition is met after receiving the DCI if the condition is unmet when receiving the DCI; and
execute the NES CHO when evaluating the condition is met.

5. The apparatus of claim 1, wherein the apparatus is configured to:
check whether the condition exists when receiving the DCI if the condition is unmet when receiving the DCI.

6. The apparatus of claim 5, wherein the apparatus is configured to:
execute the NES CHO if the condition exists when receiving the DCI.

7. The apparatus of claim 6, wherein the apparatus is configured to:
execute the NES CHO without further evaluating the condition if the condition exists when receiving the DCI.

8. The apparatus of claim 5, wherein the apparatus is configured to:
continue evaluating whether the condition is met after receiving the DCI if the condition exists when receiving the DCI; and
execute the NES CHO when evaluating the condition is met.

9. The apparatus of claim 5, wherein the apparatus is configured to:
refrain from executing the NES CHO if the condition does not exist when receiving the DCI.

10. The apparatus of claim 9, wherein the apparatus is configured to:
perform at least one of the following if refraining from executing the NES CHO:
radio resource control (RRC) reestablishment,
cell selection,
cell reselection, or
cell redirection.

11. The apparatus of claim 1, wherein
the measurement time delay is larger than a time to identify a detectable target cell.

12. The apparatus of claim 1, wherein
the condition is met if a difference between two consecutive measurements related to the condition is below a threshold.

13. An apparatus for a terminal device, comprising:
at least one processor; and
at least one memory storing instructions that, when executed by the at least one processor, cause the apparatus at least to:
receive downlink control information (DCI) indicating a network energy saving (NES) mode after detecting a condition of a NES conditional handover (CHO) is met;
check whether the condition is met when receiving the DCI; and
complete the NES CHO within a handover delay comprising a measurement time delay,
wherein the measurement time delay is from a timing the condition starts to exist to a timing of successfully decoding the DCI, plus an additional time from the timing of successfully decoding the DCI to a timing of evaluating the condition is met, if continuing evaluating whether the condition is met after receiving the DCI.

14. The apparatus of claim 13, wherein the additional time is less than a measurement period of synchronous signal blocks based measurement.

15. A non-transitory computer readable medium comprising program instructions that, when executed by an apparatus for a terminal device, cause the apparatus to at least perform:

receiving downlink control information (DCI) indicating a network energy saving (NES) mode after detecting a condition of a NES conditional handover (CHO) is met;

checking whether the condition is met when receiving the DCI; and completing the NES CHO within a handover delay comprising a measurement time delay, wherein the measurement time delay is from a timing the condition starts to exist to a timing of successfully decoding the DCI, if executing the NES CHO when receiving the DCI.

* * * * *